US010412398B2

(12) United States Patent
Urata

(10) Patent No.: US 10,412,398 B2
(45) Date of Patent: Sep. 10, 2019

(54) IMAGE PROCESSING DEVICE AND IMAGE PROCESSING METHOD

(71) Applicant: Sony Corporation, Tokyo (JP)

(72) Inventor: Kaoru Urata, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 143 days.

(21) Appl. No.: 14/630,153

(22) Filed: Feb. 24, 2015

(65) Prior Publication Data

US 2015/0281692 A1 Oct. 1, 2015

(30) Foreign Application Priority Data

Mar. 31, 2014 (JP) ................................ 2014-073032

(51) Int. Cl.

*H04N 19/119* (2014.01)
*H04N 19/33* (2014.01)
*H04N 19/31* (2014.01)
*H04N 19/436* (2014.01)

(52) U.S. Cl.

CPC ............ *H04N 19/33* (2014.11); *H04N 19/31* (2014.11); *H04N 19/436* (2014.11)

(58) Field of Classification Search

None
See application file for complete search history.

(56) References Cited

U.S. PATENT DOCUMENTS 5,982,946 A * 11/1999 Murakami ............... G06T 5/20 382/205
7,701,365 B2 4/2010 Fukuhara et al.
8,098,947 B2 1/2012 Fukuhara et al.
8,107,755 B2 1/2012 Hosaka et al.
2008/0123970 A1* 5/2008 Ozaki .................. H04N 1/387 382/232
2009/0274378 A1* 11/2009 Fukuhara ............ H04N 19/647 382/232

FOREIGN PATENT DOCUMENTS

JP 4254867 4/2009
JP 4356033 11/2009
JP 4900720 3/2012

OTHER PUBLICATIONS

U.S. Appl. No. 14/628,795, filed Feb. 23, 2015, Urata.

* cited by examiner

*Primary Examiner* — Fred H Hu
(74) *Attorney, Agent, or Firm* — Oblon, McClelland, Maier & Neustadt, L.L.P.

(57) ABSTRACT

Provided is an image processing device including a first rearrangement unit configured to rearrange first divided image data, which is image data corresponding to respective first divided regions obtained by dividing images to be processed represented by processing target image data in the horizontal direction and in the vertical direction, for each of second divided regions, obtained by dividing the images to be processed composed of a plurality of the first divided regions, in an order corresponding to the respective second divided regions, a compression processing unit configured to compress respective pieces of second divided image data, which are image data corresponding to the respective second divided regions, by performing a transform in a predetermined scheme, quantization, and variable length encoding on the data, and a second rearrangement unit configured to rearrange the compressed second divided image data in an order corresponding to all of the images to be processed.

9 Claims, 12 Drawing Sheets

IMAGE PROCESSING DEVICE AND IMAGE PROCESSING METHOD

CROSS REFERENCE TO RELATED APPLICATIONS

This application claims the benefit of Japanese Priority Patent Application JP 2014-073032 filed Mar. 31, 2014, the entire contents of which are incorporated herein by reference.

BACKGROUND

The present disclosure relates to an image processing device and an image processing method.

Technologies relating to compression coding of image data have been developed. As technologies relating to compression coding of image data, for example, the technologies disclosed in JP 4900720B, JP 4254867B, and JP 4356033B are exemplified.

SUMMARY

When image data is compressed, it is desired that the compression of the image data be performed with few delays. Such compression of image data with few delays is desired more when the image data that is a processing target is image data of a broader band, for example, 4K (ultra high definition (HD); 4096 (in the horizontal direction)×2160 (in the vertical direction) pixels, or the like), 480 [frame/sec], or the like.

The present disclosure proposes a novel and improved image processing device and image processing method that can achieve reduction of delays in compression of image data.

According to an embodiment of the present disclosure, there is provided an image processing device including a first rearrangement unit configured to rearrange first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions, a compression processing unit configured to compress respective pieces of second divided image data, which are image data corresponding to the respective second divided regions, by performing a transform in a predetermined scheme, quantization, and variable length encoding on the data, and a second rearrangement unit configured to rearrange the compressed second divided image data in an order corresponding to all of the images to be processed.

According to another embodiment of the present disclosure, there is provided an image processing method executed by an image processing device, the method including rearranging first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions, compressing respective pieces of second divided image data, which are image data corresponding to the respective second divided regions, by performing a transform in a predetermined scheme, quantization, and variable length encoding on the data, and rearranging the compressed second divided image data in an order corresponding to all of the images to be processed.

According to one or more embodiments of the present disclosure, reduction of delays in compression of image data can be achieved.

Note that the effects described above are not necessarily limited, and along with or instead of the effects, any effect that is desired to be introduced in the present specification or other effects that can be expected from the present specification may be exhibited.

DETAILED DESCRIPTION OF THE EMBODIMENT(S)

Figure 1:
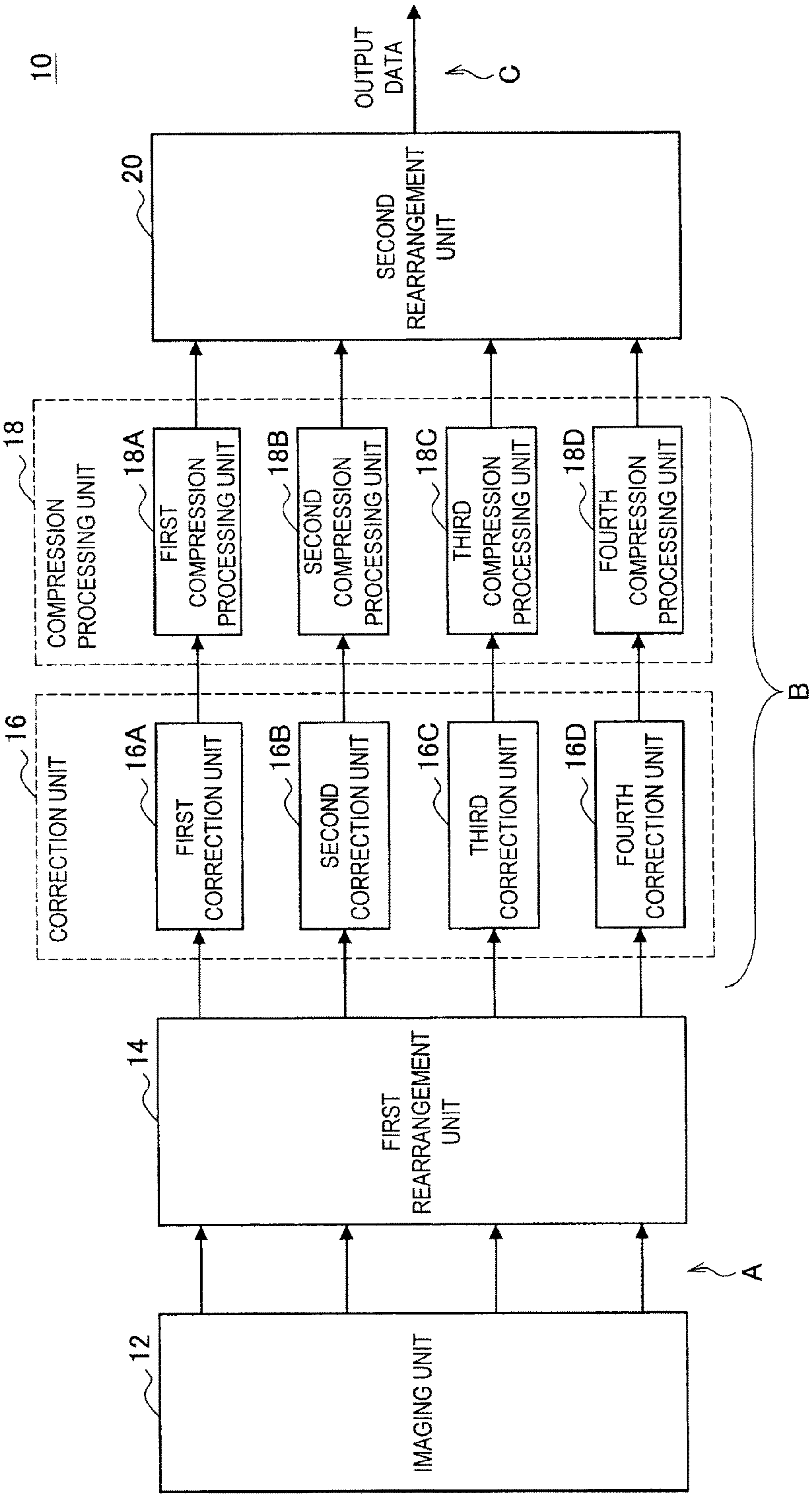
FIG. 1 is a block diagram showing an example of a configuration of an image processing device that can compress image data.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will hereinafter be provided in the following order.

1. Image processing method according to an embodiment
2. Image processing device according to an embodiment 3. Image processing system according to an embodiment
4. Program according to an embodiment Image Processing Method According to an Embodiment Before a configuration of an image processing device according to an embodiment is described, an image processing method according to an embodiment will be first described. The image processing method according to the embodiment will be described hereinbelow mainly exemplifying a case in which the image processing device according to the embodiment performs a process relating to the image processing method according to the embodiment. Note that the processes relating to the image processing method according to the embodiment can also be performed in an image processing system in which a plurality of devices are provided as shown in application examples of the image processing method according to the embodiment to be described later.

An Example of a Configuration of an Image Processing Device that can Compress Image Data Before the image processing method according to the embodiment is described, an example of a configuration of an image processing device that is considered to be capable of compressing image data will be described.

FIG. 1 is a block diagram showing the example of the configuration of the image processing device 10 that can compress image data.

The image processing device 10 is provided with, for example, an imaging unit 12, a first rearrangement unit 14, a correction unit 16, a compression processing unit 18, and a second rearrangement unit 20, and compresses image data.

In the image processing device 10, a processor that is configured by an arithmetic operation circuit, for example, a micro processing unit (MPU), and the like plays the roles of the first rearrangement unit 14, the correction unit 16, the compression processing unit 18, and the second rearrangement unit 20. In addition, the first rearrangement unit 14, the correction unit 16, the compression processing unit 18, and the second rearrangement unit 20 may be configured by a dedicated (or a general-purpose) circuit that can execute processes of the respective units.

Here, FIG. 1 shows an example in which the image processing device 10 performs parallel processes in order to shorten a processing time taken when, for example, the image processing device compresses broadband image data such as 4K, or 480 [frame/sec]. To be specific, FIG. 1 shows an example in which the image processing device 10 divides an image represented by image data that is a processing target (which may be referred to hereinafter as an "image to be processed") into four regions, and performs processes on the four respective regions in parallel.

Hereinbelow, each of the regions obtained by dividing the image to be processed may be referred to as a "divided region." In addition, image data corresponding to N (N is an integer equal to or greater than 2) divided regions may be referred to as "image data with N channels."

Figure 2:
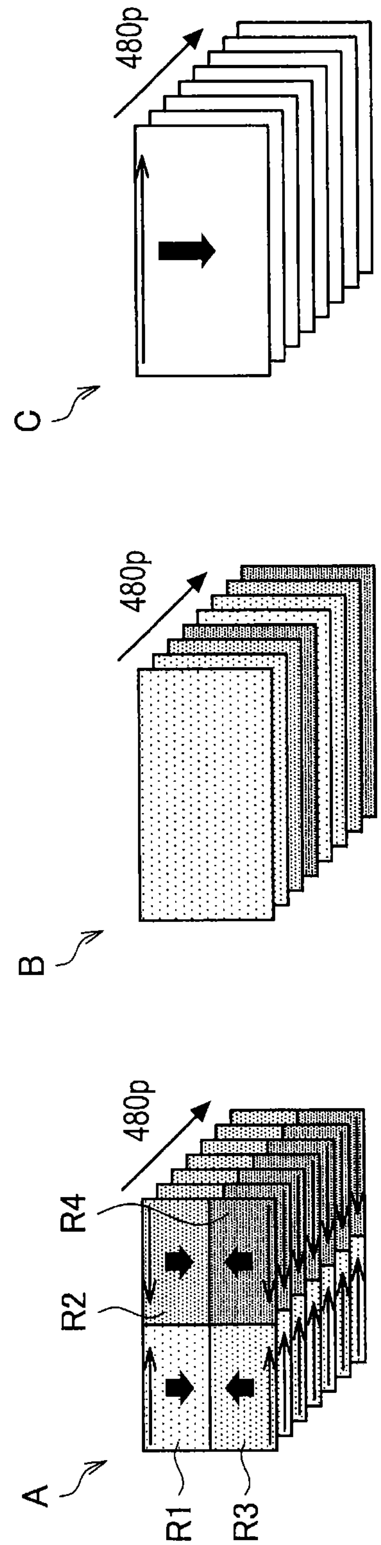
FIG. 2 is an illustrative diagram showing an example of image data processed in the image processing device shown in FIG. 1.

FIG. 2 is an illustrative diagram showing an example of image data processed in the image processing device 10 shown in FIG. 1. A of FIG. 2 shows an example of the image data output from the imaging unit 12 of FIG. 1, and B of FIG. 2 shows an example of the image data processed in the correction unit 16 and the compression processing unit 18 of FIG. 1. In addition, C of FIG. 2 shows an example of the image data output from the second rearrangement unit 20 (the output data shown in FIG. 1).

Hereinbelow, the example of the configuration of the image processing device 10 shown in FIG. 1 will be described appropriately referring to FIG. 2.

The imaging unit 12 captures images (still images or dynamic images), and generates image data indicating the captured images. Hereinbelow, a case in which the imaging unit 12 captures a dynamic image of 4K or 480 [frame/sec] will be exemplified.

As the imaging unit 12, for example, an imaging device constituted by lenses of an optical system, an image sensor that uses a plurality of imaging elements such as a complementary metal oxide semiconductor (CMOS), and a signal processing circuit is exemplified. The signal processing circuit is provided with, for example, an automatic gain control (AGC) circuit and an analog-to-digital converter (ADC), and converts analog signals generated by the imaging elements into digital signals (image data).

In addition, the imaging unit 12 conveys image data of the four respective divided regions according to reading in a reading order by the imaging elements which correspond to the respective divided regions to the first rearrangement unit 14.

A of FIG. 2 is an example of the image data output from the imaging unit 12. R1 to R4 shown in A of FIG. 2 are examples of the four divided regions. A of FIG. 2 shows the case in which the divided regions are regions of an image to be processed divided into two equal parts in each of the horizontal direction and in the vertical direction.

With respect to the upper-left region in FIG. 2 indicated by R1 of A of FIG. 2, the upper-right region in FIG. 2 indicated by R2 of A of FIG. 2, the lower-left region in FIG. 2 indicated by R3 of A of FIG. 2, and the lower-right region in FIG. 2 indicated by R4 of A of FIG. 2, the imaging unit 12 conveys the image data described below to the first rearrangement unit 14.

- Upper-left region (R1 of A of FIG. 2): Image data according to reading from the imaging element which corresponds to the upper left side of the image
- Upper-right region (R2 of A of FIG. 2): Image data according to reading from the imaging element which corresponds to the upper right side of the image
- Lower-left region (R3 of A of FIG. 2): Image data according to reading from the imaging element which corresponds to the lower left side of the image
- Lower-right region (R4 of A of FIG. 2): Image data according to reading from the imaging element which corresponds to the lower right side of the image The first rearrangement unit 14, for example, converts the image data of 480 [frame/sec] conveyed from the imaging unit 12 into image data of 120 [frame/sec] of 4 channels corresponding to the four respective divided regions R1 to R4. B of FIG. 2 shows an example of image data converted by the first rearrangement unit 14 and processed by the correction unit 16 and the compression processing unit 18.

The correction unit 16 corrects the respective image data of the four channels in parallel. In FIG. 1, an example in which the correction unit 16 is provided with a first correction unit 16A, a second correction unit 16B, a third correction unit 16C, and a fourth correction unit 16D is shown, and the respective first correction unit 16A, second correction unit 16B, third correction unit 16C, and fourth correction unit 16D perform processes in parallel.

As a process relating to correction of the correction unit 16, for example, a process of determining a defective pixel through a threshold value process or the like and then interpolating the pixel value of a pixel determined as a defective pixel using the pixel value of a pixel adjacent to the pixel that has been determined as a defective pixel, or the like is exemplified.

The compression processing unit 18 compresses the respective image data of the four channels that has been corrected by the correction unit 16 by performing a transform in a predetermined scheme, quantization, and variable length coding thereon. FIG. 1 shows a case in which the compression processing unit 18 is provided with a first compression processing unit 18A, a second compression processing unit 18B, a third compression processing unit 18C, and a fourth compression processing unit 18D, and the respective first compression processing unit 18A, second compression processing unit 18B, third compression processing unit 18C, and fourth compression processing unit 18D perform processes in parallel.

As the predetermined scheme, for example, a wavelet transform is exemplified.

The second rearrangement unit 20 rearranges the compressed image data of four channels conveyed from the compression processing unit 18 into image data of 480 [frame/sec] of one channel corresponding to all images to be processed.

C of FIG. 2 is an example of the image data output from the second rearrangement unit 20. The second rearrangement unit 20 rearranges the compressed image data of four channels by performing rearrangement, which is performed in the horizontal direction from the upper left side of the images to be processed, in the vertical-downward direction in order, as shown in, for example, C of FIG. 2.

The image processing device 10 can compress the image data with the configuration shown in, for example, FIG. 1.

The image processing device 10, however, converts the image data of 480 [frame/sec] into image data of 120 [frame/sec] of four channels first, and thus, in the first rearrangement unit 14 of the image processing device 10, writing and reading of the image data of 4K or 480 [frame/sec] in and from a memory occur. For this reason, when image data is compressed using the image processing device 10, it is necessary to provide a memory with a broader band and a capacity in which image data of one or more frames can be stored.

Thus, when image data is compressed using the image processing device 10, undesirable situations in which a size of a memory increases, miniaturization of the image processing device 10 becomes difficult, the cost of the image processing device 10 increases, and the like arise.

Figure 3:
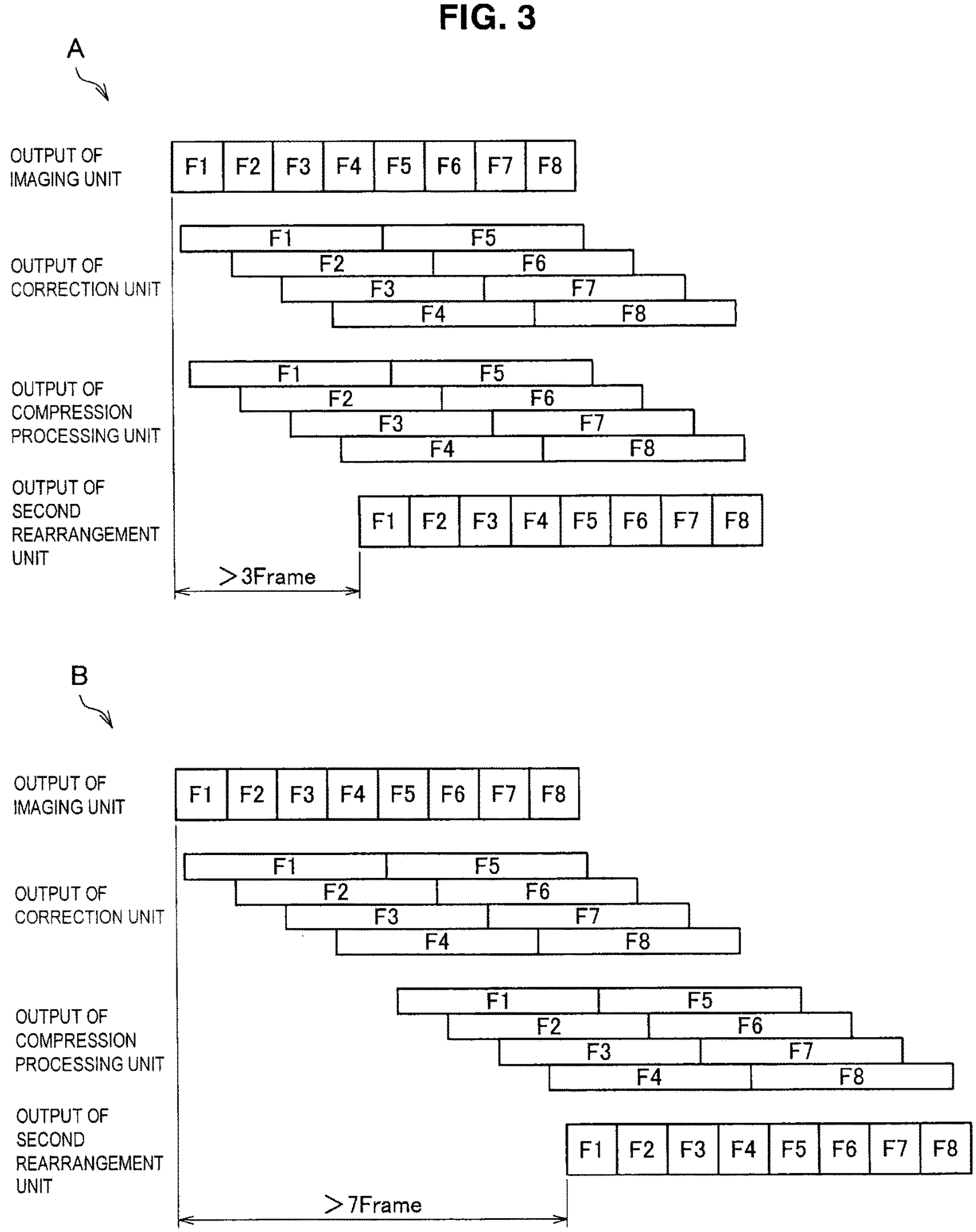
FIG. 3 is an illustrative diagram showing examples of delays that can occur in the image processing device shown in FIG. 1.

FIG. 3 is an illustrative diagram showing examples of delays that can occur in the image processing device 10 shown in FIG. 1. Fn (n is a positive integer) shown in FIG. 3 indicates an image of each frame of image data that is a processing target. A shown in FIG. 3 shows an example of a delay that can occur when an equal length unit is set to a transfer unit (TU; which is equivalent to, for example, a 16-line unit, and one frame is about 140 TUs) which is one horizontal unit of a wavelet transform. In addition, B shown in FIG. 3 shows an example of a delay that can occur when an equal length unit is set to one frame.

Since the image processing device 10 converts the image data into the image data of 120 [frame/sec] first, when the image data is compressed using the image processing device 10, a serious delay of three or more frames occurs in the process as shown in, for example, A of FIG. 3 and B of FIG. 3.

Overview of the Image Processing Method According to an Embodiment

Next, processes relating to the image processing method according to an embodiment will be described.

The image processing device according to the embodiment performs, for example, (1) a first rearrangement process, (2) a compression process, and (3) a second rearrangement process as the processes relating to the image processing method according to the embodiment.

(1) First Rearrangement Process

The image processing device according to the present embodiment rearranges first divided image data which is image data corresponding to respective first divided regions of image data which is a processing target for each of second divided regions in an order corresponding to the respective second divided regions.

Here, as the processing target image data according to the present embodiment, for example, image data that represents images (dynamic images or still images) with any of various kinds of resolutions such as 4K or HD is exemplified. To give a specific example, image data that represents dynamic images of, for example, 4K or 480 [frame/sec], HD or 1000 [frame/sec], or the like is exemplified as the processing target image data according to the present embodiment. Note that it is needless to say that processing target image data according to the present embodiment is not limited to the example described above.

In addition, as the processing target image data according to the present embodiment, for example, image data generated through imaging by an imaging device that has a plurality of imaging elements (which may be referred to hereinafter as "imaged data") is exemplified. In addition, the processing target image data according to the present embodiment may be image data such as imaged data stored in a recording medium. Hereinbelow, a case in which the processing target image data according to the present embodiment is imaged data will be exemplified.

The processing target image data according to the present embodiment may be, for example, image data that represents a raw image, and a plurality of pieces of image data each corresponding to red (R), green (G), or blue (B).

In addition, the first divided regions according to the present embodiment are regions obtained by dividing an image to be processed which is indicated by the processing target image data in the horizontal direction and in the vertical direction.

As the first divided regions according to the present embodiment, for example, four regions obtained by dividing an image to be processed into two in each of the horizontal direction and the vertical direction are exemplified. Note that the first divided regions according to the present embodiment are not limited to the four regions described above, and may be four or more regions according to the number of divisions. Hereinbelow, the case in which the first divided regions according to the present embodiment are four regions obtained by dividing an image to be processed into two equal parts in each of the horizontal direction and the vertical direction will be exemplified.

In addition, the second divided regions according to the present embodiment are, for example, regions obtained by dividing an image to be processed, and are composed of a plurality of first divided regions. The second divided regions according to the present embodiment may include, for example, regions obtained by dividing an image to be processed in the horizontal direction, regions obtained by dividing an image to be processed in the vertical direction, and the like. Hereinbelow, the case in which the second divided regions according to the present embodiment are regions obtained by dividing an image to be processed in the horizontal direction will be exemplified.

To give a specific example of the second divided regions according to the present embodiment, two regions obtained by dividing an image to be processed into two in the horizontal direction are exemplified as the second divided regions. Note that the second divided regions according to the present embodiment are not limited to the two regions described above, and may be three or more regions according to the number of divisions in the vertical direction. Hereinbelow, the case in which the second divided regions according to the present embodiment are two regions obtained by dividing an image to be processed into two in the horizontal direction will be exemplified.

To be more specific, the image processing device according to the present embodiment specifies arrangement order of first divided image data for each of the first divided regions. Here, when processing target image data is imaged data that has been generated through imaging by an imaging device which has a plurality of imaging elements, the arrangement order of the first divided image data for each first divided region corresponds to a reading order of the imaging elements which correspond to the respective first divided regions.

The image processing device according to the present embodiment specifies the arrangement order of the first divided image data of each of the first divided regions based on, for example, first order information (data) in which an arrangement order of each of the first divided regions is set. The first order information according to the present embodiment is stored in a recording medium, for example, a read only memory (ROM), a storage unit (which will be described later), an external recording medium connected to the image processing device according to the present embodiment, or the like, and the image processing device according to the present embodiment specifies the arrangement order of the first divided image data by reading the first order information from the recording medium. In addition, the image processing device according to the present embodiment may acquire the first order information according to the present embodiment together with the processing target image data, and specify the arrangement order of the first divided image data based on the acquired first order information.

When the arrangement order of the first divided image data of each of the first divided regions is specified, the image processing device according to the present embodiment rearranges the first divided image data of the first divided regions each corresponding to the respective second divided regions for each of the second divided regions in an order corresponding to the respective second divided regions.

The image processing device according to the present embodiment specifies the order corresponding to the respective second divided regions based on, for example, second order information (data) in which an arrangement order of the second divided regions is set. The second order information according to the present embodiment is stored in a recording medium, for example, a ROM, a storage unit (which will be described later), an external recording medium which is connected to the image processing device according to the present embodiment, or the like, and the image processing device according to the present embodiment specifies an order corresponding to the respective second divided regions by reading the second order information from the recording medium. Here, the order corresponding to the respective second divided regions represented by the second order information may be a fixed order that is set in advance, an order that is set through a user operation, or the like.

An example of rearrangement in the order corresponding to the second divided regions according to the present embodiment will be described later.

(2) Compression Process

The image processing device according to the present embodiment compresses respective pieces of image data corresponding to the respective second divided regions (which will be referred to hereinafter as "second divided image data") by performing a transform in a predetermined scheme, quantization, and variable length coding thereon.

As the transform in the predetermined scheme according to the present embodiment, for example, a wavelet transform, a discrete cosine transform (which may be referred to as a "DCT"), and the like are exemplified. Hereinbelow, a case in which the image processing device according to the present embodiment performs a wavelet transform on the second divided image data will be exemplified.

The image processing device according to the present embodiment compresses image data that has been transformed in the predetermined scheme by performing, for example, quantization and variable length coding thereon in a predetermined unit that is based on a reference unit corresponding to the predetermined scheme.

Here, as the reference unit corresponding to the predetermined scheme according to the present embodiment, for example, the following are exemplified.

TU (when the predetermined scheme is a wavelet transform)

Slice (when the predetermined scheme is a DCT)

In addition, as the predetermined unit that is based on the reference unit according to the present embodiment, for example, the reference unit itself, a plurality of reference units, one frame, and the like are exemplified. Hereinbelow, a case in which the predetermined unit according to the present embodiment is a TU will be mainly exemplified.

Note that the image processing device according to the present embodiment can perform an arbitrary process in which respective pieces of the second divided image data can be compressed by performing a transform in the predetermined scheme, quantization, and variable length coding thereon in the compression process.

(3) Second Rearrangement Process

The image processing device according to the present embodiment rearranges the second divided image data that has been compressed in the process (2) (compression process) described above in an order corresponding to all images to be processed.

The image processing device according to the present embodiment specifies an order corresponding to all images to be processed based on, for example, third order information (data) in which an arrangement order of all of the images to be processed is set. The third order information according to the present embodiment is stored in a recording medium, for example, a ROM, a storage unit (which will be described later), an external recording medium connected to the image processing device according to the present embodiment, or the like, and the image processing device according to the present embodiment specifies the order corresponding to all of the images to be processed by reading the third order information from the recording medium. Here, the order corresponding to all of the images to be processed represented by the third order information may be a fixed order that is set in advance, or an order that is set based on a user operation or the like.

An example of rearrangement in the order corresponding to all of the images to be processed according to the present embodiment will be described later.

As the image processing device according to the present embodiment performs a transform in a predetermined scheme, quantization, and coding on image data that is a processing target by performing, for example, the process (1) (first rearrangement process), the process (2) (compression process), and the process (3) (second rearrangement process) described above as processes relating to the image processing method according to the present embodiment, the processing target image data is thereby compressed.

Note that processes relating to the image processing method according to the present embodiment are not limited to the process (1) (first rearrangement process) to the process (3) (second rearrangement process).

The image processing device according to the present embodiment may further perform, for example, a correction process in which respective pieces of the first divided image data are corrected.

As the correction process according to the present embodiment, for example, an interpolation process of interpolating the pixel value of a pixel that is determined to be a defective pixel is exemplified. The image processing device according to the present embodiment determines a defective pixel through, for example, a threshold value process or the like, and then interpolates the pixel value of a pixel that has been determined as a defective pixel using the pixel value of a pixel adjacent to the pixel that has been determined as a defective pixel, or the like.

Note that a correction process according to the present embodiment is not limited to the above-described interpolation process, and an arbitrary image process in which the pixel value of a pixel that has been determined as a defective pixel is corrected is exemplified.

When the image processing device according to the present embodiment further performs a (4) correction process as a process relating to the image processing method according to the present embodiment, the image processing device according to the present embodiment rearranges the pieces of the first divided image data that have been corrected in the (4) correction process in the process (1) (first rearrangement process) described above.

Thus, when the image processing device according to the present embodiment further performs the (4) correction process as a process relating to the image processing method according to the present embodiment, the processing target image data can be compressed while the pixel value of a pixel that has been determined as a defective pixel is corrected.

Hereinbelow, effects exhibited when the image processing method according to the present embodiment is used will be described, giving an example of a configuration of an image processing device according to another embodiment that can realize the processes relating to the image processing method according to the embodiment.

Hereinbelow, a case in which image data that is a processing target according to the present embodiment is imaged data of 4K or 480 [frame/sec] will be exemplified. In addition, hereinbelow, a case in which the first divided regions according to the present embodiment are four regions obtained by dividing an image to be processed into two equal parts in each of the horizontal direction and the vertical direction and the second divided regions according to the present embodiment are two regions obtained by dividing an image to be processed into two in the horizontal direction will be exemplified. In addition, hereinbelow, a case in which the predetermined scheme according to the present embodiment is a wavelet transform will be exemplified.

Image Processing Device According to the Present Embodiment

Figure 4:
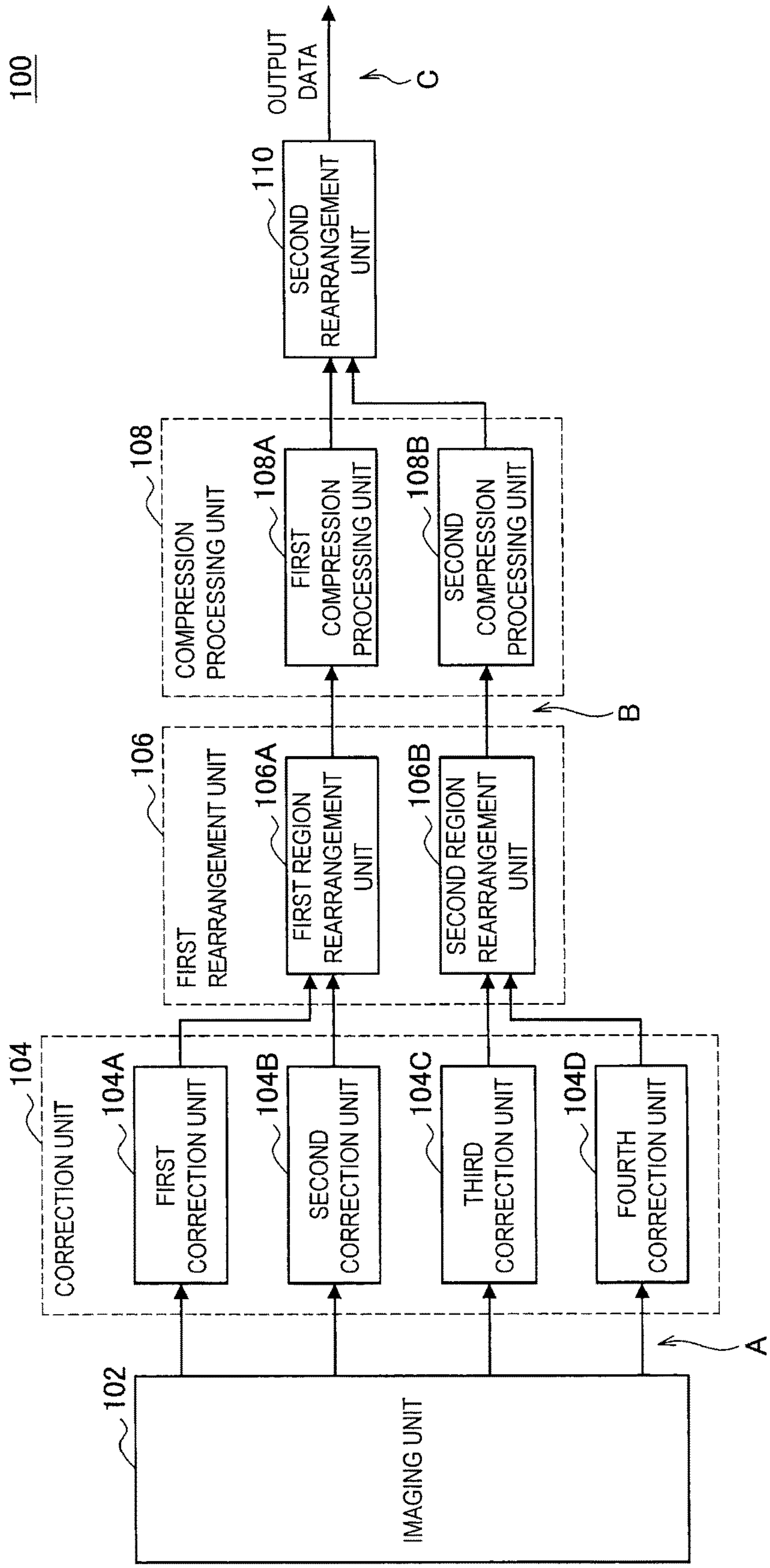
FIG. 4 is a block diagram showing an example of a configuration of an image processing device according to an embodiment.

FIG. 4 is a block diagram showing the example of the configuration of the image processing device 100 according to the present embodiment.

The image processing device 100 is provided with, for example, an imaging unit 102, a correction unit 104, a first rearrangement unit 106, a compression processing unit 108, and a second rearrangement unit 110.

In addition, the image processing device 100 may be provided with, for example, a control unit (not illustrated), a ROM (not illustrated), a random access memory (RAM; not illustrated), a communication unit for performing communication with external devices (not illustrated), a storage unit (not illustrated), and the like.

The control unit (not illustrated) includes, for example, a processor configured by an arithmetic operation circuit such as a micro processing unit (MPU), various circuits, and the like, and controls the entire image processing device 100. In addition, the control unit (not illustrated) may play, for example, one or two or more roles of the correction unit 104, the first rearrangement unit 106, the compression processing unit 108, and the second rearrangement unit 110 in the image processing device 100. Note that it is needless to say that one or two or more of the correction unit 104, the first rearrangement unit 106, the compression processing unit 108, and the second rearrangement unit 110 may be configured by a dedicated (or general-purpose) circuit that can realize processes of the respective units.

The ROM (not illustrated) stores programs or data for control such as arithmetic operation parameters that the control unit (not illustrated) uses. The RAM (not illustrated) temporarily stores programs and the like that are executed by the control unit (not illustrated).

The communication unit (not illustrated) is a communication section provided in the image processing device 100, and plays a role of communicating with external devices via a network (or directly) in a wireless or wired manner. Here, as the communication unit (not illustrated), for example, an optical fiber connection terminal and a transmission and reception circuit, a communication antenna and a radio frequency (RF) circuit, an IEEE802.11 port and a transmission and reception circuit (for wireless communication), and the like are exemplified. In addition, as the network according to the present embodiment, for example, a wired network such as a local area network (LAN) or a wide area network (WAN), a wireless network such as a wireless local area network (WLAN) or a wireless wide area network (WWAN) via a base station, the Internet using a communication protocol such as transmission control protocol/Internet protocol (TCP/IP), or the like is exemplified.

The storage unit (not illustrated) is a storing channel provided in the image processing device 100, storing various kinds of data, for example, image data, applications, and the like. Here, as the storage unit (not illustrated), for example, a magnetic recording medium such as a hard disk, a non-volatile memory such as a flash memory, and the like are exemplified. In addition, the storage unit (not illustrated) may be detachable from the image processing device 100.

Figure 5:
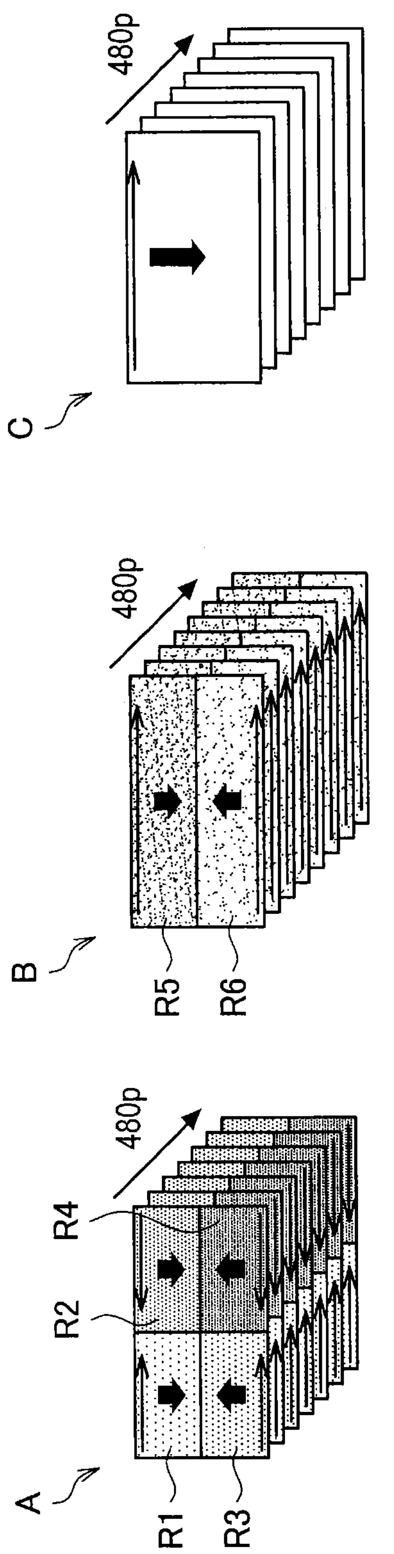
FIG. 5 is an illustrative diagram showing an example of image data processed in the image processing device shown in FIG. 4.

FIG. 5 is an illustrative diagram showing an example of image data processed in the image processing device 100 shown in FIG. 4. A of FIG. 5 shows an example of the image data output from the imaging unit 102 of FIG. 4, and B of FIG. 5 shows an example of the image data output from the first rearrangement unit 106 of FIG. 4. In addition, C of FIG. 5 shows an example of the image data output from the second rearrangement unit 110 of FIG. 4 (the output data shown in FIG. 4). Hereinbelow, the example of the configuration of the image processing device 100 shown in FIG. 4 will be described appropriately referring to FIG. 5.

The imaging unit 102 is an imaging channel provided in the image processing device 100, captures images (still images or dynamic images), and thereby generates image data that represents the captured images. Hereinbelow, a case in which the imaging unit 102 captures a dynamic image of 4K or 480 [frame/sec] will be exemplified.

As the imaging unit 102, for example, an imaging device constituted by lenses of an optical system, an image sensor that uses a plurality of imaging elements such as a CMOS, and a signal processing circuit is exemplified. The signal processing circuit is provided with, for example, an AGC circuit and an ADC, and converts analog signals generated by the imaging elements into digital signals (image data).

In addition, the imaging unit 102 conveys the first divided image data of the respective first divided regions according to reading in a reading order by the imaging elements which correspond to the four respective first divided regions to the correction unit 104.

A of FIG. 5 is an example of the image data output from the imaging unit 102. R1 to R4 shown in A of FIG. 5 are examples of the four divided first regions. A of FIG. 5 shows the case in which the first divided regions are regions of an image to be processed divided into two equal parts in each of the horizontal direction and in the vertical direction.

With respect to the upper-left region in FIG. 5 indicated by R1 of A of FIG. 5, the upper-right region in FIG. 5 indicated by R2 of A of FIG. 5, the lower-left region in FIG. 5 indicated by R3 of A of FIG. 5, and the lower-right region in FIG. 5 indicated by R4 of A of FIG. 5, the imaging unit 102 conveys the first divided image data described below to the correction unit 14.

- Upper-left region (R1 of A of FIG. 5): Image data according to reading from the imaging element which corresponds to the upper left side of the image
- Upper-right region (R2 of A of FIG. 5): Image data according to reading from the imaging element which corresponds to the upper right side of the image
- Lower-left region (R3 of A of FIG. 5): Image data according to reading from the imaging element which corresponds to the lower left side of the image
- Lower-right region (R4 of A of FIG. 5): Image data according to reading from the imaging element which corresponds to the lower right side of the image Here, the image sensor constituting the imaging unit 102 has a greater number (for example, 4160 (in the horizontal direction)×2192 (in the vertical direction)) of imaging elements than the number corresponding to resolution of a captured image (for example, 4096 (in the horizontal direction)×2160 (in the vertical direction)). When the image sensor constituting the imaging unit 102 has a greater number of imaging elements than the number corresponding to resolution of a captured image, the image data output from the image sensor constituting the imaging unit 102 ends up with a region that does not correspond to the image (a so-called ineffective region) outside the region corresponding to the captured image (a so-called effective image region).

When the image sensor constituting the imaging unit 102 has a greater number of imaging elements than the number corresponding to resolution of a captured image, the first divided image data output from the imaging unit 102 includes data which is read from the imaging elements corresponding to the ineffective region. The data which is read from the imaging elements corresponding to the ineffective region is used in, for example, off-set correction or variation correction in the correction unit 104.

Here, when the correction unit 104 performs off-set correction or variation correction using the data which is read from the imaging elements corresponding to the ineffective region, for example, processing is easily performed when the data is sequentially read from the imaging elements corresponding to the ineffective region. For this reason, an arrangement order of the pieces of the first divided image data conveyed by the imaging unit 102 to the correction unit 104 comes to correspond to an order in which the data is sequentially read from the imaging elements corresponding to the ineffective region as shown in, for example, R1 to R4 of A of FIG. 5.

Note that first divided image data conveyed by the imaging unit 102 to the correction unit 104 is not limited to the example shown above. An arrangement order of the first divided image data conveyed by the imaging unit 102 to the correction unit 104 may be the same as the plurality of first divided regions.

The correction unit 104 plays a leading role in performing the process (4) (correction process) to correct the first divided image data of four channels conveyed from the imaging unit 102.

FIG. 4 shows an example in which the correction unit 104 is provided with, for example, a first correction unit 104A that processes the first divided image data corresponding to the region R1 of A of FIG. 5, a second correction unit 104B that processes the first divided image data corresponding to the region R2 of A of FIG. 5, a third correction unit 104C that processes the first divided image data corresponding to the region R3 of A of FIG. 5, and a fourth correction unit 104D that processes the first divided image data corresponding to the region R4 of A of FIG. 5. In the image processing device 100, the processor that has a plurality of cores, for example, functions as the correction unit 104, and the cores of the processor are allocated to each of the first correction unit 104A, the second correction unit 104B, the third correction unit 104C, and the fourth correction unit 104D. Further, the respective first correction unit 104A, second correction unit 104B, third correction unit 104C, and fourth correction unit 104D perform processes in parallel.

As a process relating to correction of the correction unit 104, for example, a process of determining a defective pixel through a threshold value process or the like and then interpolating the pixel value of a pixel determined as a defective pixel using the pixel value of a pixel adjacent to the pixel that has been determined as a defective pixel, or the like is exemplified.

The first arrangement unit 106 plays a leading role in performing the process (1) (first rearrangement process) described above to rearrange the first divided image data for each of the second divided regions in an order corresponding to the second divided regions.

B of FIG. 5 is an example of the image data output from the first rearrangement unit 106. R5 and R6 shown in B of FIG. 5 are an example of two second divided regions. In B of FIG. 5, a case in which the second divided regions are regions obtained by dividing an image to be processed into two equal parts in the horizontal direction is shown.

In FIG. 4, a case in which the first rearrangement unit 106 is provided with a first region rearrangement unit 106A and a second region rearrangement unit 106B is shown. In the image processing device 100, the processor that has the plurality of cores functions as the first rearrangement unit 106, and the cores of the processor are allocated to each of the first region rearrangement unit 106A and the second region rearrangement unit 106B. In addition, the respective first region rearrangement unit 106A and second region rearrangement unit 106B perform processes in parallel.

The first region rearrangement unit 106A rearranges the first divided image data conveyed from the first correction unit 104A and the first divided image data conveyed from the second correction unit 104B in an order corresponding to the second divided region indicated by R5 of B of FIG. 5. To be specific, the first region rearrangement unit 106A rearranges the conveyed first divided image data by performing rearrangement, which is performed in the horizontal direction from the upper left side of the second divided region, in the vertical-downward direction in order as indicated by, for example, R5 of B of FIG. 5.

The second region rearrangement unit 106B rearranges the first divided image data conveyed from the third correction unit 104C and the first divided image data conveyed from the fourth correction unit 104D in an order corresponding to the second divided region indicated by R6 of B of FIG. 5. To be specific, the second region rearrangement unit 106B rearranges the conveyed first divided image data by performing rearrangement, which is performed in the horizontal direction from the lower left side of the second divided region, in the vertical-upward direction in order as indicated by, for example, R6 of B of FIG. 5.

Note that an example of rearrangement of each of the second divided regions performed by the first rearrangement unit 106 is not limited to the example shown in B of FIG. 5. The first rearrangement unit 106, for example, can also rearrange the first divided image data corresponding to each second divided region in the same arrangement order for the plurality of second divided regions.

The compression processing unit 108 plays a leading role in performing the process (2) (compression process) described above to compress respective pieces of the second divided image data conveyed from the first rearrangement unit 106 by performing a transform in a predetermined scheme, quantization, and variable length encoding thereon.

In FIG. 4, a case in which the compression processing unit 108 is provided with a first compression processing unit 108A that compresses the second divided image data conveyed from the first region rearrangement unit 106A and a second compression processing unit 108B that compresses the second divided image data conveyed from the second region rearrangement unit 106B is shown. In the image processing device 100, for example, the processor that has the plurality of cores functions as the compression processing unit 108, and the cores of the processor are allocated to each of the first compression processing unit 108A and the second compression processing unit 108B. In addition, the respective first compression processing unit 108A and second compression processing unit 108B perform processes in parallel.

The first compression processing unit 108A and the second compression processing unit 108B perform, for example, a wavelet transform on the second divided image data, then perform quantization and variable length encoding on the wavelet-transformed image data, and thereby compress the data. In addition, the first compression processing unit 108A and the second compression processing unit 108B may transform the second divided image data in an arbitrary scheme, for example, a DCT or the like that can be used in a process relating to compression of image data.

When the first compression processing unit 108A and the second compression processing unit 108B perform a wavelet transform, the first compression processing unit 108A and the second compression processing unit 108B match TU units so that the TU units are consistent with each other when, for example, the second rearrangement unit 110 performs rearrangement.

Figure 6A:
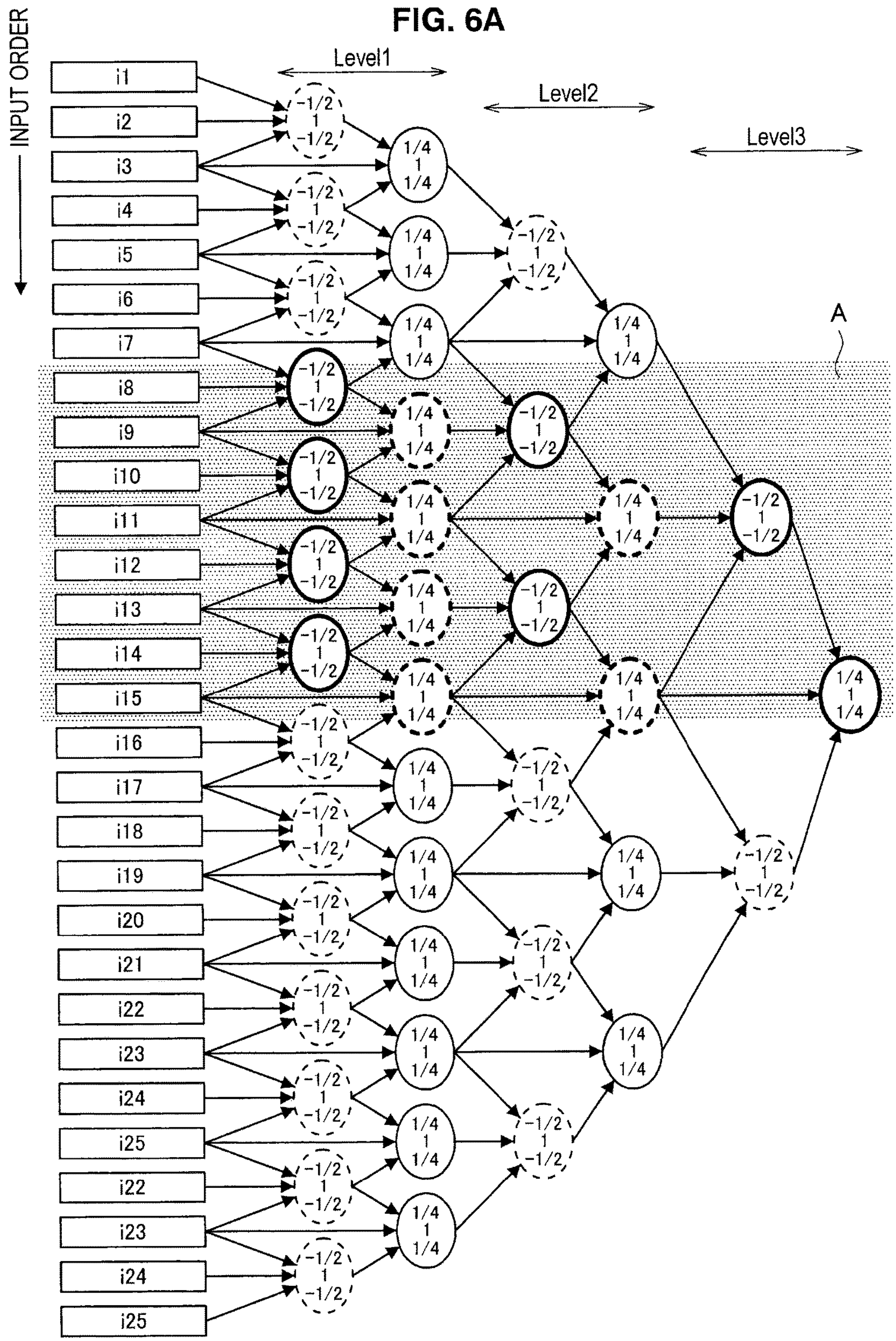
FIG. 6A is an illustrative diagram for describing an example of a process performed by an compression processing unit shown in FIG. 4.
Figure 6B:
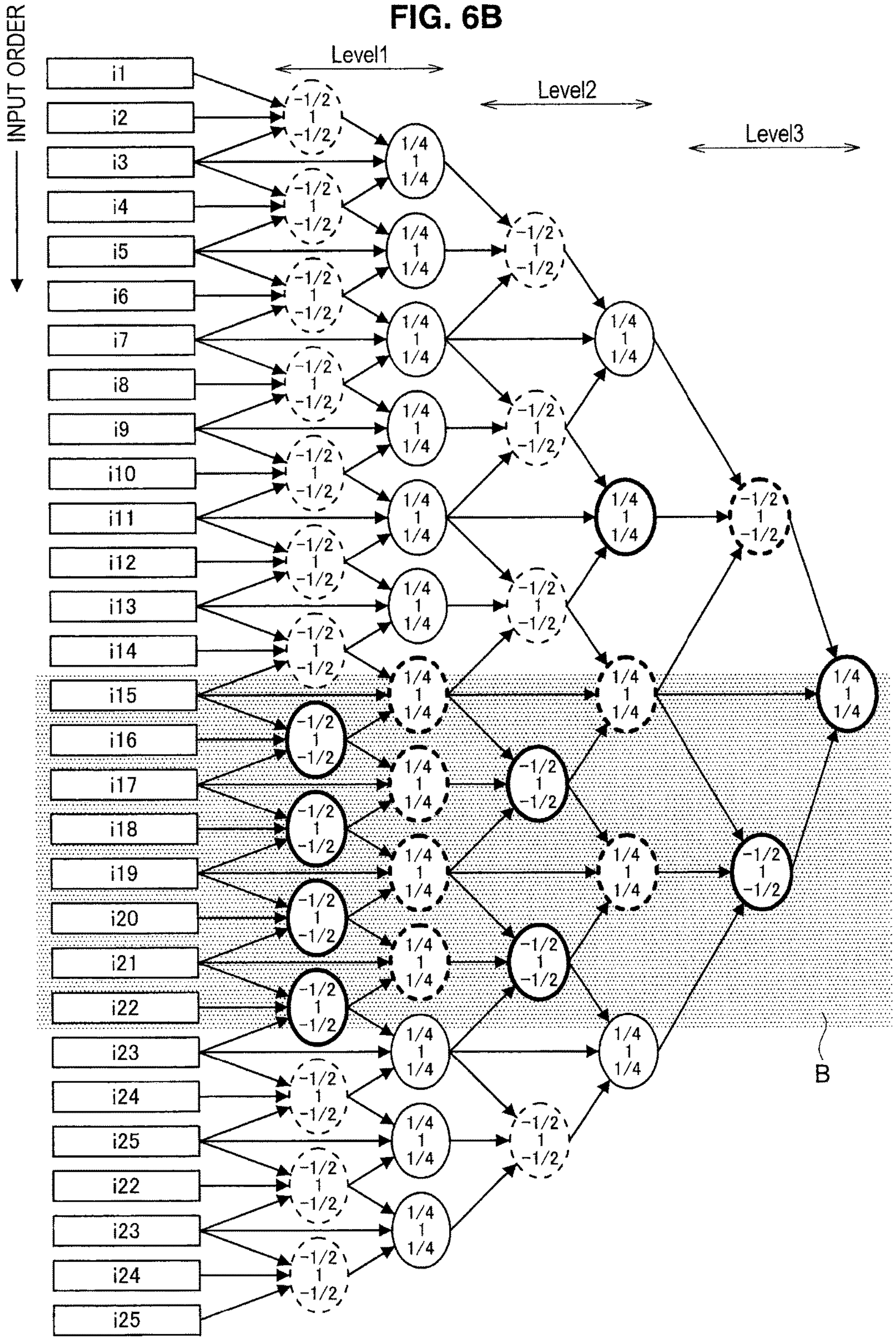
FIG. 6B is an illustrative diagram for describing an example of a process performed by an compression processing unit shown in FIG. 4.

FIGS. 6A and 6B are illustrative diagrams for describing an example of processes performed by the compression processing unit 108 shown in FIG. 4. FIG. 6A shows an example of combination of centroids of respective components of TU units of a wavelet transform performed by the first compression processing unit 108A, and B of FIG. 6 shows an example of combination of centroids of respective components of TU units of a wavelet transform performed by the second compression processing unit 108B.

When a rearrangement order of the first divided image data in the first region rearrangement unit 106A and a rearrangement order of the first divided image data in the second region rearrangement unit 106B are as shown in the example indicated by R5 and R6 of B of FIG. 5, for example, the first compression processing unit 108A sets A of FIG. 6A as a TU unit, and the second compression processing unit 108B sets B of FIG. 6B as a TU unit. In this case, the compression processing unit 108 can match the TU units of the two second divided regions indicated by R5 and R6 of B of FIG. 5 because the first compression processing unit 108A sets A of FIG. 6A as a TU unit and the second compression processing unit 108B sets B of FIG. 6B as a TU unit.

The compression processing unit 108 specifies an arrangement order of the second divided image data of each of the second divided regions based on, for example, the second order information stored in the recording medium, and matches TU units in the second divided regions. Note that a TU unit according to the present embodiment is not limited to the examples shown in FIGS. 6A and 6B, and can be changed according to the arrangement order of the second divided image data of each of the second divided regions.

The second rearrangement unit 110 plays a leading role in performing the process (3) (second rearrangement process) to rearrange the compressed second divided image data conveyed from the compression processing unit 108 in an order corresponding to all images to be processed.

C of FIG. 5 is an example of the image data output from the second rearrangement unit 110. The second rearrangement unit 110 rearranges the conveyed compressed second divided image data by performing rearrangement, which is performed in the horizontal direction from the upper left side of an image to be processed, in the vertical-downward direction in order as shown in, for example, C of FIG. 5.

With the configuration shown in FIG. 4, for example, the image processing device 100 performs the process (4) (correction process) and the process (1) (first rearrangement process) to the process (3) (second rearrangement process) described above relating to the image processing method according to the present embodiment, and then compresses image data generated from imaging by the imaging unit 102.

Here, after the image processing device 100 compresses the second divided image data for the respective second divided regions using the compression processing unit 108, the second rearrangement unit 110 rearranges the compressed second divided image data in an order corresponding to all of the images to be processed. Thus, the image processing device 100 can lower a band and a capacity of a memory (frame memory) that are used during rearrangement to the extent that the image data is compressed.

In addition, since the processes performed by the respective first rearrangement unit 106 and compression processing unit 108 are performed, for example, in parallel, the image processing device 100 can lower a band and a capacity of the memory used during the processes more than when all of the images to be processed are processed.

In addition, since the processes can be performed in parallel in the configuration shown in FIG. 4, the image processing device 100 can realize a broadband.

In addition, the image processing device 100 does not perform a transform into image data of 120 [frame/sec] as the image processing device 10 shown in FIG. 1 does. Thus, the image processing device 100 does not cause a delay that would occur in the image processing device 10 shown in FIG. 1 as a result of a transform into image data of 120 [frame/sec], and therefore, delays can be reduced more.

Figure 7:
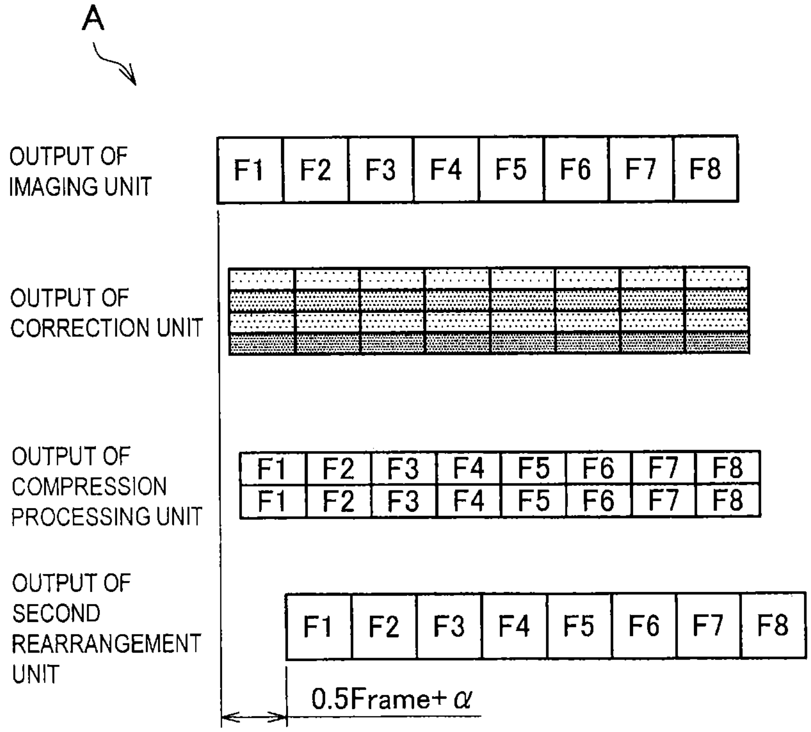
FIG. 7 is an illustrative diagram showing examples of delays that can occur in the image processing device shown in FIG. 4.
Figure 7:
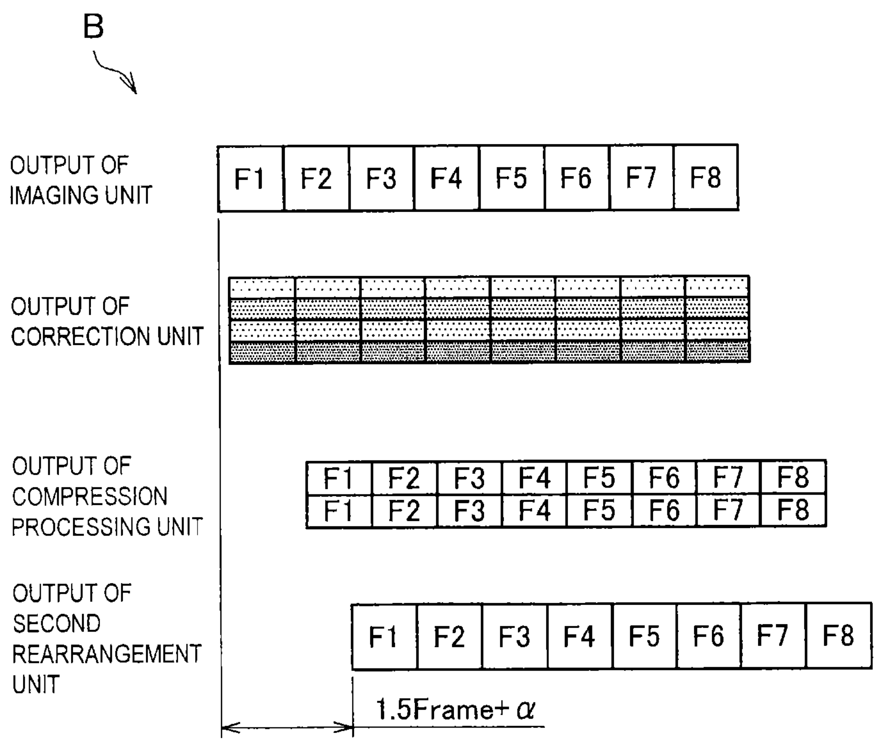

FIG. 7 is an illustrative diagram showing examples of delays that can occur in the image processing device 100 shown in FIG. 4. Fn shown in FIG. 7 indicates an image of each frame of processing target image data. A shown in FIG. 7 shows an example of a delay that can occur when an equal length unit is set to a TU which is one horizontal unit of a wavelet transform, the same as A of FIG. 3. In addition, B shown in FIG. 7 shows an example of a delay that can occur when an equal length unit is set to one frame, the same as B of FIG. 3.

Since the image processing device 100 does not perform a transform into image data of 120 [frame/sec], unlike the image processing device 10 shown in FIG. 1 as shown in A of FIG. 7 and B of FIG. 7, it is ascertained that delays are reduced more than the delays that occur in the image processing device 10 shown in A of FIG. 3 and B of FIG. 3.

Thus, with the configuration shown in FIG. 4, for example, the image processing device 100 can achieve reduction of a delay in compression of image data.

Note that a configuration of the image processing device according to the present embodiment is not limited to the configuration shown in FIG. 4.

When, for example, the image processing device according to the present embodiment processes image data generated from imaging performed by an external imaging device or image data stored in a recording medium such as a storage unit (not illustrated), the image processing device according to the present embodiment may not be provided with the imaging unit 102.

In addition, the image processing device according to the present embodiment can also adopt a configuration in which the correction unit 104 is not provided (regardless of provision of the imaging unit 102).

Even when the image processing device according to the present embodiment adopts any configuration described above, the image processing device according to the present embodiment can perform the process (1) (first rearrangement process) to the process (3) (second rearrangement process) described above according to the present embodiment.

Thus, even when the image processing device according to the present embodiment adopts any configuration described above, the image processing device according to the present embodiment can achieve reduction of a delay in compression of image data, like the image processing device 100 shown in FIG. 4. Further, even when the image processing device according to the present embodiment adopts any configuration described above, the image processing device according to the present embodiment can lower a band and a capacity of a memory used in respective processes such as rearrangement, like the image processing device 100 shown in FIG. 4.

Image Processing System According to an Embodiment

In the description provided above, the example in which the image processing method according to the embodiment is applied to one image processing device has been shown; however, the image processing method according to the embodiment can also be performed in an image processing system that has a plurality of devices (image processing devices). Thus, an image processing system according to an embodiment in which processes relating to the image processing method according to the embodiment can be performed will be described next.

Figure 8:
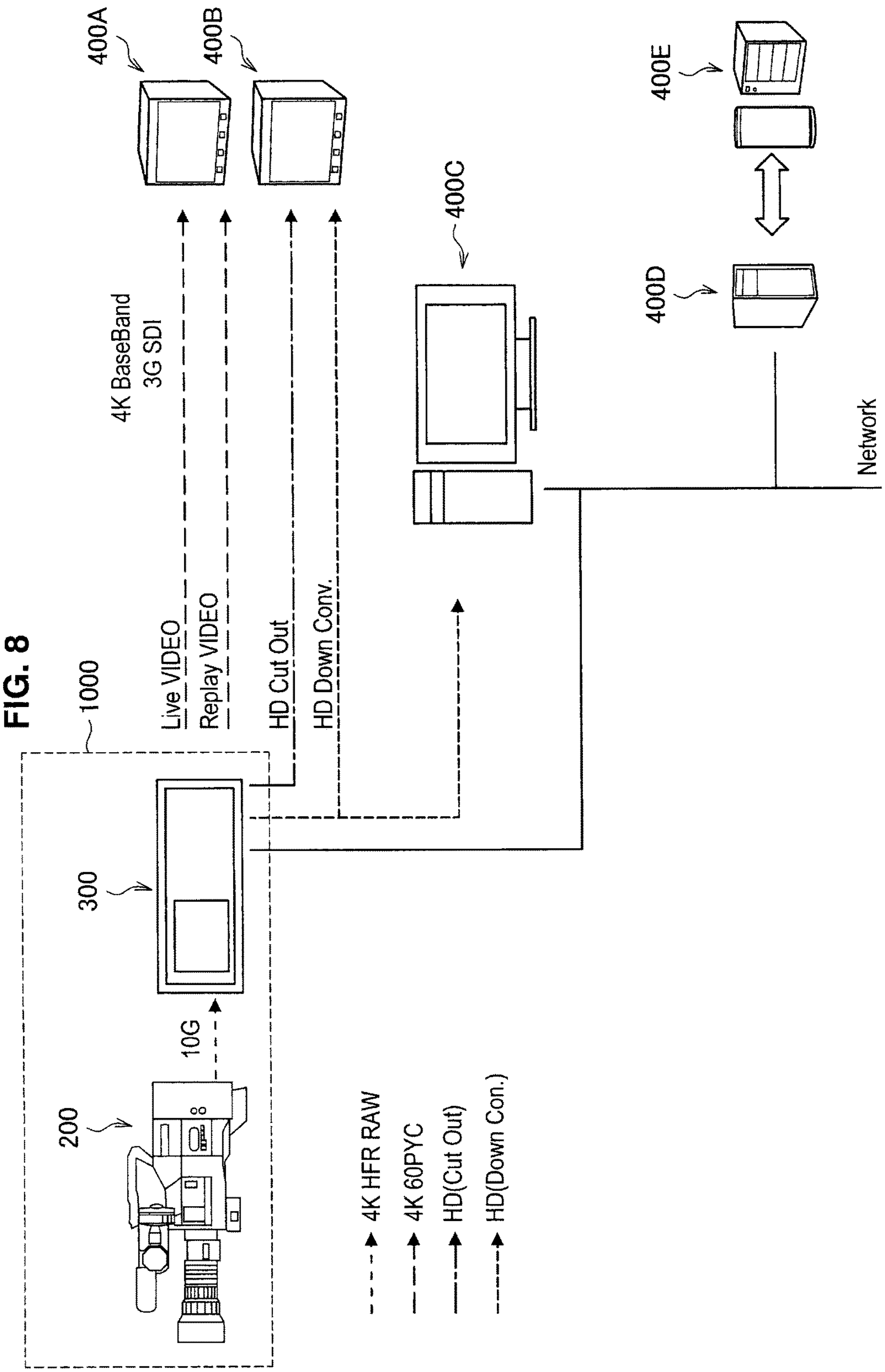
FIG. 8 is an illustrative diagram showing an example of an image processing system according to an embodiment.

[I] Overview of an Example of the Image Processing System According to the Present Embodiment FIG. 8 is an illustrative diagram showing an example of an image processing system 1000 according to the present embodiment. The image processing system 1000 shown in FIG. 8 has an imaging device 200 (an example of a first image processing device) and a processing device 300 (an example of a second image processing device). The image processing system 1000 is an example of the image processing system according to the present embodiment in which the processing device 300 transmits an image captured by the imaging device 200 to an external device as a live video in real time and transmits the image to the external device as a replay video in non-real time.

In addition, the processing device 300 constituting the image processing system 1000 may have a function of transmitting an image which corresponds to a partial region of the image captured by the imaging device 200 to another external device ("HD Cut Out" shown in FIG. 8) and a function of transmitting an image, which is obtained by down-converting an image which corresponds to a partial region of the image captured by the imaging device 200, to the external device ("HD Down Cony."). In addition, the processing device 300 constituting the image processing system 1000 may have a function of transmitting image data to an external device via a network (or in a direct manner).

In FIG. 8, external devices 400A, 400B, 400C, and 400D are shown as external devices to which the processing device 300 transmits image data representing various images. Hereinbelow, the external devices 400A, 400B, 400C, 400D, . . . to which the processing device 300 transmits image data are collectively referred to as "external devices 400." In addition, as shown by the external device 400D of FIG. 8, image data that has been transmitted from the processing device 300 may further be transmitted to or received from another external device 400E. The imaging device 200 captures dynamic images, and transmits image data which represents the captured dynamic images to the processing device 300. Hereinbelow, a case in which the imaging device 200 captures a dynamic image of 4K or 480 [frame/sec] will be exemplified.

Figure 9:
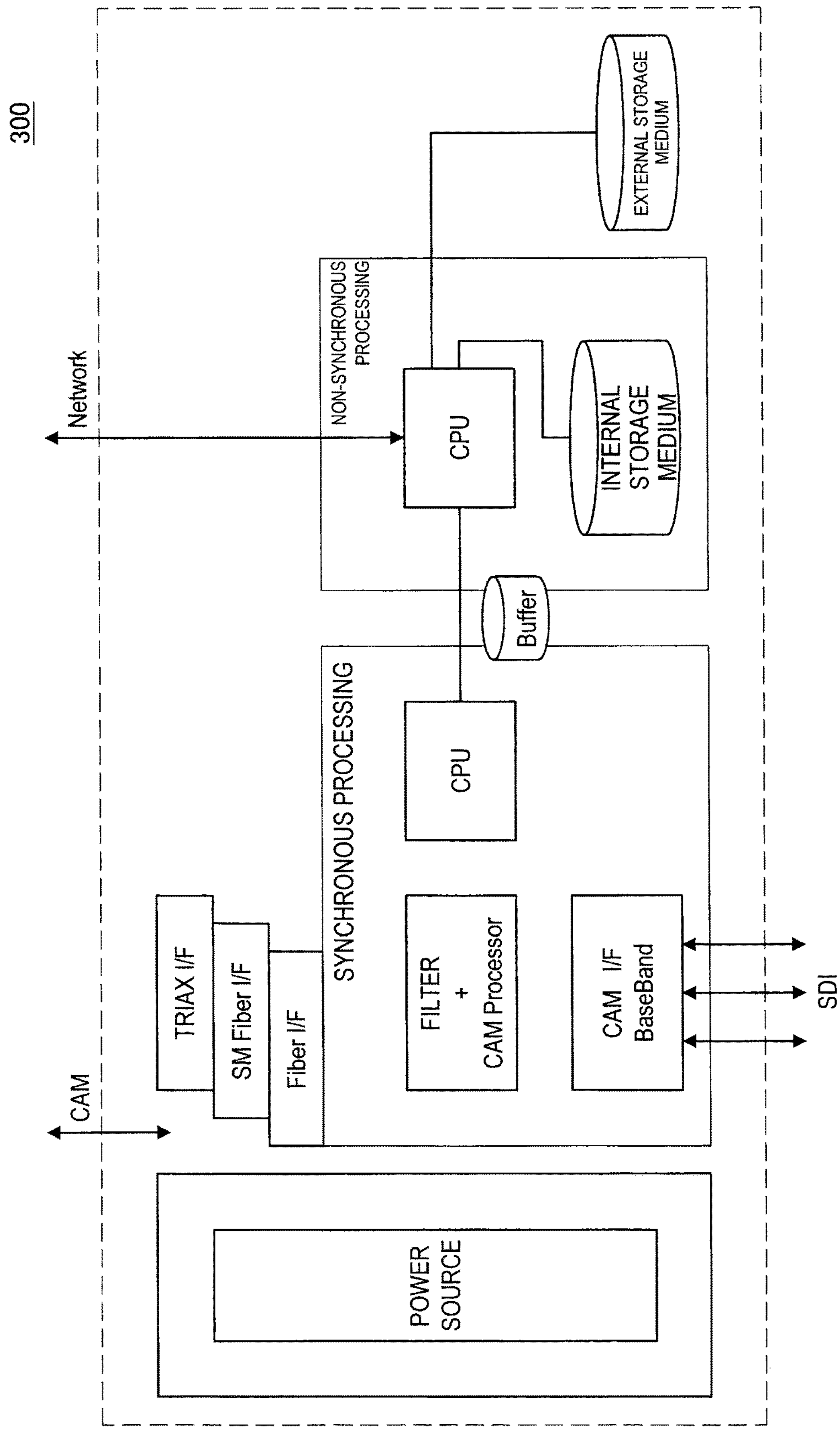
FIG. 9 is an illustrative diagram showing an example of a concept of a hardware configuration of a processing device constituting the image processing system according to an embodiment.

The processing device 300 processes image data transmitted from the imaging device 200, and transmits the image data which represents various images to the external devices 400. FIG. 9 is an illustrative diagram showing an example of a concept of a hardware configuration of the processing device 300 constituting the image processing system 1000 according to the present embodiment. Note that it is needless to say that a concept of the hardware configuration of the processing device 300 is not limited to the example shown in FIG. 9.

In addition, the processing device 300 may have a so-called camera control function (CCU function) for controlling imaging of the imaging device 200.

[II] An Example of a Configuration of the Image Processing System According to the Present Embodiment to which the Imaging Processing Method According to the Embodiment is Applied Next, an example of a configuration of the image processing system according to the present embodiment to which the imaging processing method according to the embodiment is applied will be described.

Hereinbelow, a case in which the image processing system according to the present embodiment is the image processing system 1000 shown in FIG. 8 will be exemplified. Note that it is needless to say that the image processing system according to the present embodiment is not limited to the image processing system 1000 shown in FIG. 8.

In addition, hereinbelow, a case in which first divided regions according to the present embodiment are four regions obtained by dividing an image to be processed into two equal parts in each of the horizontal direction and the vertical direction and second divided regions according to the present embodiment are two regions obtained by dividing the image to be processed into two in the horizontal direction will be exemplified.

Figure 10:
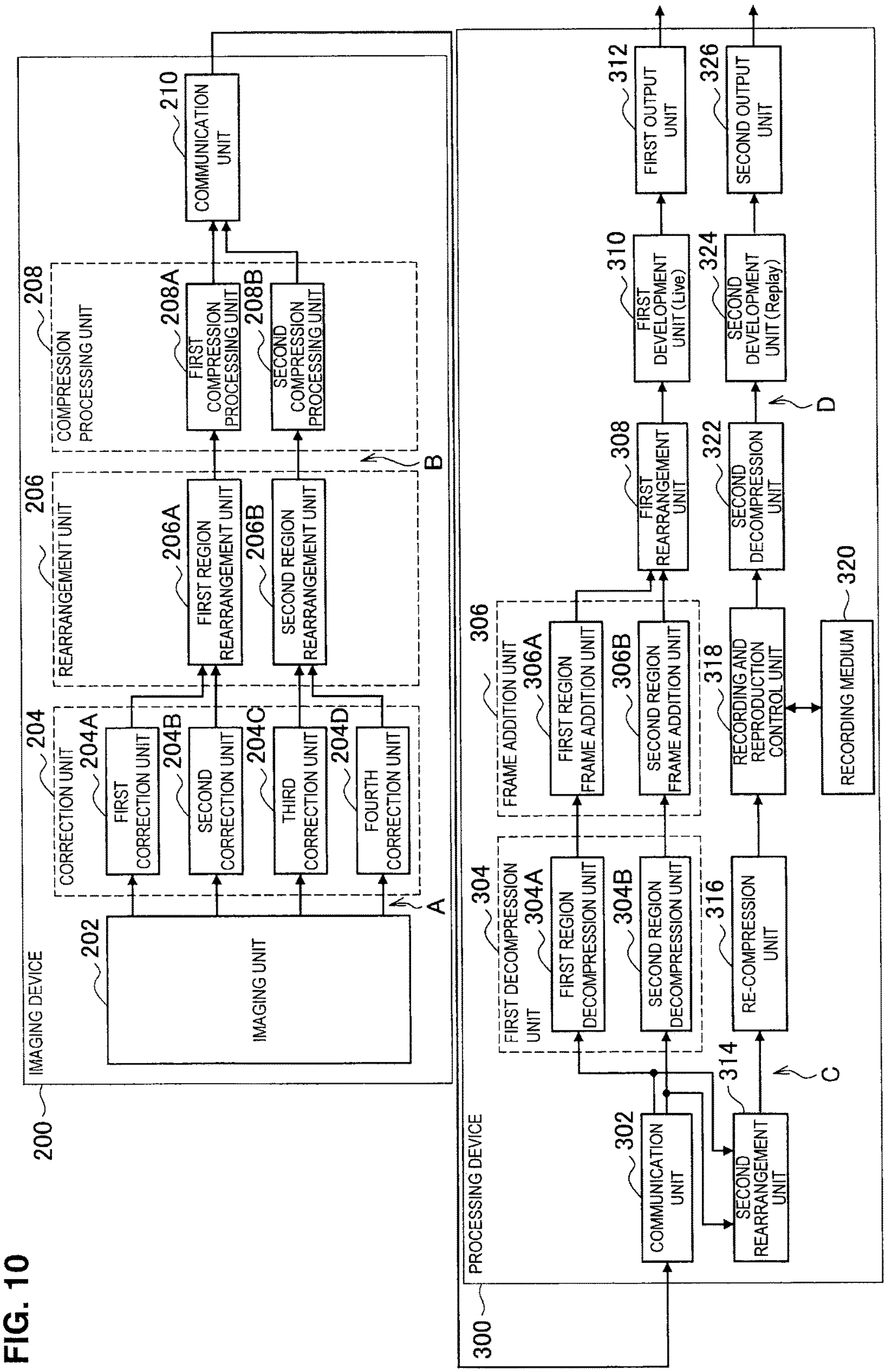
FIG. 10 is an illustrative diagram showing an example of a configuration of the image processing system according to an embodiment.

FIG. 10 is an illustrative diagram showing the example of the configuration of the image processing system according to the embodiment, showing the image processing device 200 (an example of a first image processing device) and the processing device 300 (an example of a second image processing device) which constitute the image processing system 1000.

Figure 11:
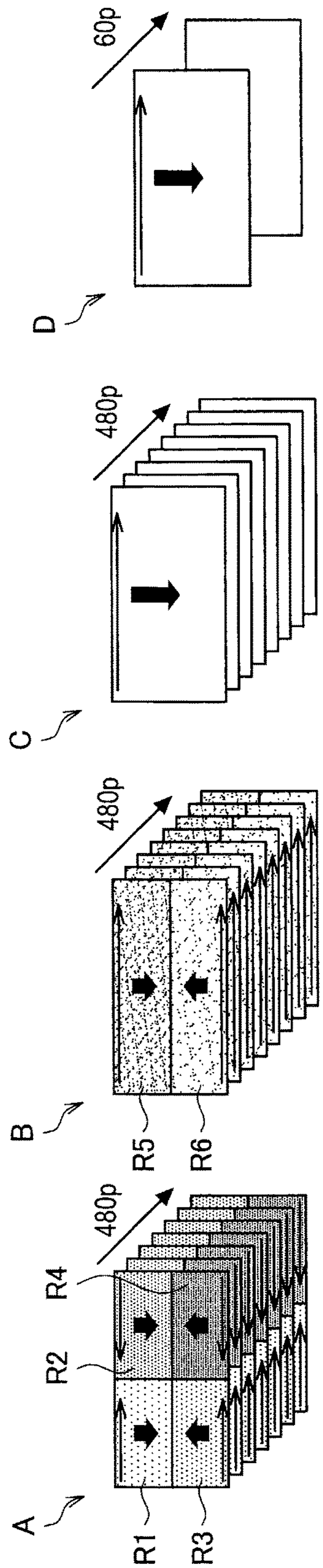
FIG. 11 is an illustrative diagram showing an example of image data processed in the image processing system shown in FIG. 10.

FIG. 11 is an illustrative diagram showing an example of image data processed in the image processing system 1000 shown in FIG. 10. A of FIG. 11 is an example of the image data output from an imaging unit 202 provided in the imaging device 200 of FIG. 10, and B of FIG. 11 shows an example of the image data output from a rearrangement unit 206 provided in the imaging device 200 of FIG. 10. In addition, C of FIG. 11 shows an example of the image data output from a second rearrangement unit 314 provided in the processing device 300 of FIG. 10, and D of FIG. 11 shows an example of the image data output from a second decompression unit 322 provided in the processing device 300 of FIG. 10.

Hereinbelow, an example of the configuration of the image processing system 1000 shown in FIG. 10 will be described appropriately referring to FIG. 11.

[II-1] Imaging Device 200

The imaging device 200 is provided with the imaging unit 202, a correction unit 204, a rearrangement unit 206, a compression processing unit 208, and a communication unit 210.

Here, in the imaging device 200 shown in FIG. 10, the correction unit 204 plays a role of performing the process (4) (correction process), and the rearrangement unit 206 plays a role of performing the process (1) (first rearrangement process). In addition, in the imaging device 200 shown in FIG. 10, for example, the compression processing unit 208 plays a role of performing the process (2) (compression process).

In addition, in the imaging device 200 shown in FIG. 10, the imaging unit 202, the correction unit 204, the rearrangement unit 206, and the compression processing unit 208 correspond to the constituent elements of the image processing device 100 shown in FIG. 4 as follows.

- Imaging unit 202: The imaging unit 102 of the image processing device 100
- Correction unit 204: The correction unit 104 of the image processing device 100
- Rearrangement unit 206: The first rearrangement unit 106 of the image processing device 100
- Compression processing unit 208: The compression processing unit 108 of the image processing device 100

In addition, the imaging device 200 may be provided with, for example, a control unit (not illustrated), a ROM (not illustrated), a RAM (not illustrated), a storage unit (not illustrated), and the like.

The control unit (not illustrated) includes, for example, a processor configured by an arithmetic operation circuit such as an MPU, various circuits, and the like, and controls the entire imaging device 200. In addition, the control unit (not illustrated) may play, for example, one or two or more roles of the correction unit 204, the rearrangement unit 206, and the compression processing unit 208 in the imaging device 200. Note that it is needless to say that one or two or more of the correction unit 204, the rearrangement unit 206, and the compression processing unit 208 may be configured by a dedicated (or general-purpose) circuit that can realize processes of the respective units.

The imaging unit 202 has, for example, the same configuration and function as the imaging unit 102 of FIG. 4. The imaging unit 202 captures images (still images or dynamic images) and thereby generates image data that represents the captured image. In addition, the imaging unit 202 conveys first divided image data of the respective first divided regions according to reading in a reading order of imaging elements which correspond to the four respective first divided regions to the correction unit 204.

The correction unit 204 has, for example, the same function as the correction unit 104 of FIG. 4 to correct respective pieces of the first divided image data of four channels conveyed from the imaging unit 202 in parallel.

In FIG. 10, an example in which the correction unit 204 is provided with, for example, a first correction unit 204A which processes first divided image data corresponding to a region R1 of A of FIG. 11, a second correction unit 204B which processes first divided image data corresponding to a region R2 of A of FIG. 11, a third correction unit 204C which processes first divided image data corresponding to a region R3 of A of FIG. 11, and a fourth correction unit 204D which processes first divided image data corresponding to a region R4 of A of FIG. 11. The respective first correction unit 204A, second correction unit 204B, third correction unit 204C, and fourth correction unit 204D perform processes in parallel.

The rearrangement unit 206 has, for example, the same function as the first rearrangement unit 106 of FIG. 4 to rearrange the first divided image data in an order corresponding to the second divided regions for each second divided region. In FIG. 10, an example in which the rearrangement unit 206 is provided with a first region rearrangement unit 206A and a second region rearrangement unit 206B and the respective first region rearrangement unit 206A and second region rearrangement unit 206B perform processes in parallel is shown.

B of FIG. 11 is an example of the image data output from the rearrangement unit 206. R5 and R6 shown in B of FIG. 11 are examples of the two second divided regions. B of FIG. 11 shows the case in which the second divided regions are regions of an image to be processed divided into two equal parts in the horizontal direction.

The first region rearrangement unit 206A rearranges the first divided image data conveyed from the first correction unit 204A and the first divided image data conveyed from the second correction unit 240B in the same order as performed by the first region rearrangement unit 106A which is shown in FIG. 4, as indicated by, for example, R5 of B of FIG. 11. In addition, the second region rearrangement unit 206B rearranges the first divided image data conveyed from the third correction unit 204C and the first divided image data conveyed from the fourth correction unit 240D in the same order as performed by the second region rearrangement unit 106B which is shown in FIG. 4, as indicated by, for example, R6 of B of FIG. 11. Note that it is needless to say that rearrangement order of each of the second divided regions by the rearrangement unit 206 is not limited to the example shown in B of FIG. 11.

The compression processing unit 208 has, for example, the same function as the compression processing unit 108 of FIG. 4 to compress respective pieces of second divided image data conveyed from the rearrangement unit 206 by performing a transform in a predetermined scheme, quantization, and variable length encoding thereon. In FIG. 10, an example in which the compression processing unit 208 is provided with a first compression processing unit 208A that compresses the second divided image data conveyed from the first region rearrangement unit 206A and a second compression processing unit 208B that compresses the second divided image data conveyed from the second region rearrangement unit 206B, and the respective first compression processing unit 208A and second compression processing unit 208B perform processes in parallel is shown.

The communication unit 210 transmits the compressed second divided image data conveyed from the compression processing unit 208 to the processing device 300. As the communication unit 210, for example, an optical fiber connection terminal and a transmission and reception circuit, a communication antenna and an RF circuit, an IEEE802.11 port and a transmission and reception circuit, and the like are exemplified.

The imaging device 200 compresses image data generated from imaging and transmits the compressed image data to the processing device 300 with, for example, the configuration shown in FIG. 10.

[II-2] Processing device 300

The processing device 300 is provided with, for example, a communication unit 302, a first decompression unit 304, a frame addition unit 306, a first rearrangement unit 308, a first development unit 310, a first output unit 312, a second rearrangement unit 314, a re-compression unit 316, a recording and reproduction control unit 318, a recording medium 320, the second decompression unit 322, a second development unit 324, and a second output unit 326.

Here, in the processing device 300 shown in FIG. 10, the second rearrangement unit 314 plays a role of performing the process (3) (second rearrangement process), and the second rearrangement unit 314 corresponds to the second rearrangement unit 110 of the image processing device 100 shown in FIG. 4.

In addition, the processing device 300 may be provided with, for example, a control unit (not illustrated), a ROM (not illustrated), a RAM (not illustrated), and a storage unit (not illustrated).

The control unit (not illustrated) includes a processor configured by an arithmetic operation circuit, for example, an MPU, various circuits, and the like, and controls the entire processing device 300. In addition, the control unit (not illustrated) may play, for example, one or two or more roles of the first decompression unit 304, the frame addition unit 306, the first rearrangement unit 308, the first development unit 310, the first output unit 312, the second rearrangement unit 314, the re-compression unit 316, the recording and reproduction control unit 318, the second decompression unit 322, the second development unit 324, and the second output unit 326 in the processing device 300. Note that it is needless to say that one or two or more of the first decompression unit 304, the frame addition unit 306, the first rearrangement unit 308, the first development unit 310, the first output unit 312, the second rearrangement unit 314, the re-compression unit 316, the recording and reproduction control unit 318, the second decompression unit 322, the second development unit 324, and the second output unit 326 may be configured by a dedicated (or general-purpose) circuit that can realize processes of the respective units.

The communication unit 302 receives the compressed second divided image data transmitted from the imaging device 200. As the communication unit 302, for example, an optical fiber connection terminal and a transmission and reception circuit, a communication antenna and an RF circuit, an IEEE802.11 port and a transmission and reception circuit, and the like are exemplified.

The first decompression unit 304 decompresses the respective pieces of the second divided image data received by the communication unit 302 by performing decoding, inverse quantization, and an inverse transform in a predetermined scheme thereon. In FIG. 10, an example in which the first decompression unit 304 is provided with a first region decompression unit 304A that processes one part of the second divided image data and a second region decompression unit 304B that processes another part of the second divided image data, and the respective first region decompression unit 304A and second region decompression unit 304B perform processes in parallel is shown.

The first region decompression unit 304A and the second region decompression unit 304B decode the compressed second divided image data in, for example, a variable length decoding scheme that corresponds to the variable length encoding scheme used by the compression processing unit provided in the imaging device 200. In addition, the first region decompression unit 304A and the second region decompression unit 304B, for example, inversely quantize the decoded image data. Then, the first region decompression unit 304A and the second region decompression unit 304B inversely transform the data in a scheme that corresponds to the predetermined scheme used by the compression processing unit provided in the imaging device 200, for example, an inverse wavelet transform, or the like.

The first rearrangement unit 308 rearranges the second divided image data that has been decompressed by the first decompression unit 304 in an order corresponding to all images to be processed.

The first rearrangement unit 308 specifies an order corresponding to all of the images to be processed based on, for example, order information (data) in which an arrangement order of all of the images to be processed is set, and then rearranges the data in the specified order. The order information according to the present embodiment is stored in a recording medium, for example, a ROM, a storage unit (which will be described later), an external recording medium connected to the image processing device according to the present embodiment, or the like, and the processing device 300 specifies the order corresponding to all of the images to be processed by reading the order information from the recording medium. Here, the order corresponding to all of the images to be processed represented by the order information may be a fixed order which is set in advance, or an order which is set based on a user operation or the like.

The frame addition unit 306 adds frames to image data decompressed by the first decompression unit 304. In FIG. 10, an example in which the frame addition unit 306 is provided with a first frame addition unit 306A that processes one part of the decompressed second divided image data and a second frame addition unit 306B that processes another part of the decompressed second divided image data and the respective first frame addition unit 306A and second frame addition unit 306B perform processes in parallel is shown.

For example, when the decompressed image data is image data of 480 [frame/sec], the first frame addition unit 306A and the second frame addition unit 306B transforms the image data into image data of 60 [frame/sec] by adding, for example, eight frames thereto.

The first development unit 310 turns the image data conveyed from the frame addition unit 306 into image data representing a live video by performing, for example, various kinds of processing relating to RAW development.

The first output unit 312 causes the image data that has been processed in the first development unit 310 (image data representing the live video) to be transmitted to the external devices 400. The first output unit 312 causes the image data to be transmitted to, for example, a communication device constituting the communication unit 302 or an external communication device connected to the processing device 300.

The second rearrangement unit 314 has the same function as the second rearrangement unit 110 of the image processing device 100 shown in FIG. 4 to rearrange the second divided image data received by the communication unit 302 in the order corresponding to all of the images to be processed.

C of FIG. 11 is an example of the image data output from the second rearrangement unit 314. The second rearrangement unit 314 rearranges the second divided image data received by the communication unit 302 in, for example, the same order as performed by the second rearrangement unit 110 shown in FIG. 4, as shown in C of FIG. 11.

After decompressing the compressed image data conveyed from the second rearrangement unit 314, the re-compression unit 316 compresses the data again. The re-compression unit 316 decompresses the compressed image data by decoding and inversely quantizing the data like, for example, the first decompression unit 304. Then, re-compression unit 316 compresses the decompressed image data again by performing, for example, quantization and variable length encoding thereon.

Here, in the image processing system 1000, the processing device 300 is assumed to receive less demand for reducing power consumption than the imaging device 200 and to have a higher processing capability than the imaging device 200. Thus, the re-compression unit 316 of the processing device 300 is highly likely to be capable of performing a process in a compression scheme which ensures higher image quality and higher compression performance than that used by the compression processing unit 208 of the imaging device 200.

Thus, the re-compression unit 316 compresses the decompressed image data again using, for example, a compression scheme different from the compression scheme of the compression processing unit 208 of the imaging device 200. To give a specific example, when the compression processing unit 208 performs quantization in units of TUs, the re-compression unit 316 compresses the decompressed image data again using a compression scheme that ensures higher image quality and higher compression performance by performing quantization in units of frames, or the like. The recording and reproduction control unit 318 records the image data compressed by the re-compression unit 316 on the recording medium 320. Here, as the recording medium 320, for example, a magnetic recording medium such as a hard disk, a non-volatile memory such as a flash memory, and the like are exemplified.

In addition, the recording and reproduction control unit 318 reads the compressed image data stored on the recording medium 320 at a speed of 60 [frame/sec] and then conveys the data to the second decompression unit 322 as image data of 60 [frame/sec].

The second decompression unit 322 decompresses the compressed image data conveyed from the recording and reproduction control unit 318 by performing decoding, inverse quantization, and an inverse transform in a predetermined scheme thereon, like the first decompression unit 304.

D of FIG. 11 is an example of the image data output from the second decompression unit 322. As shown in D of FIG. 11, an arrangement order of the image data output from the second decompression unit 322 is the same as that of the image data shown in C of FIG. 11.

The second development unit 324 turns the image data conveyed from the second decompression unit 322 into image data representing a replay video by performing, for example, various kinds of processing relating to RAW development.

The second output unit 326 causes the image data that has been processed in the second development unit 324 (image data representing the replay video) to be transmitted to the external devices 400. The second output unit 326 causes the image data to be transmitted to, for example, a communication device constituting the communication unit 302 or an external communication device connected to the processing device 300.

As the image processing system 1000 has, for example, the imaging device 200 and the processing device 300 shown in FIG. 10, a system in which image data representing a live video and image data representing a replay video can be transmitted to external devices is realized.

In addition, as the image processing system 1000 has, for example, the imaging device 200 and the processing device 300 shown in FIG. 10, an image processing system in which the processes relating to the image processing method according to the embodiment (the process (4) (correction process), and the process (1) (first rearrangement process) to the process (3) (second rearrangement process)) can be distributed to and performed by the imaging device 200 and the processing device 300 is realized.

Here, since it is not necessary in the image processing system 1000 to transform data to data of 120 [frame/sec] first, unlike in the image processing device 10 of FIG. 1, a memory for a transform (frame memory) is unnecessary and a delay caused by the transform does not occur either. Thus, the imaging device 200 constituting the image processing system 1000 can achieve further miniaturization and lower power consumption and delays that would occur in the image processing system 1000 can be reduced more than when the configuration of the image processing device 10 is employed.

In addition, the image data processed by the second rearrangement unit 314 (second divided image data) provided in the processing device 300 of the image processing system 1000 is compressed image data, and thus a band and a capacity of a memory relating to the process of the second rearrangement unit 314 can be lowered.

In addition, in the image processing system 1000, the re-compression unit 316 provided in the processing device 300 is highly likely to be capable of compressing image data using a compression scheme that ensures higher image quality and higher compression performance than the compression scheme used by the compression processing unit 208 of the imaging device 200. Here, when the re-compression unit 316 provided in the processing device 300 compresses image data using the compression scheme that ensures higher image quality and higher compression performance than the compression scheme used by the compression processing unit 208 of the imaging device 200, high image quality and high compression of the image data stored in the recording medium 320 can be realized in the image processing system 1000, and thus in this case, the image processing system 1000 can attain compatibility of high image quality and high compression (which leads to long-time recording) of image data for replay.

Although the image processing devices have been described above as the embodiments, the present embodiments are not limited thereto. The embodiments can be applied to various kinds of apparatuses that can process image data, for example, imaging device, computers such as personal computers (PCs) and servers, television receiver sets, communication devices such as mobile telephones and smartphones, tablet-type devices, video and music reproduction devices (or video and music recording and reproduction devices), game devices, and the like. In addition, the embodiments can also be applied to processing integrated circuits (ICs) that can be, for example, incorporated into the apparatuses described above.

Program According to an Embodiment

As a program for causing a computer to function as the image processing device according to the present embodiment (a program that enables execution of the processes relating to the image processing method according to the present embodiment, for example, "the process (1) (first rearrangement process) to the process (3) (second rearrangement process)," "the process (1) (first rearrangement process) to the process (3) (second rearrangement process), and the process (4) (correction process)," or the like) is executed by a processor in the computer, reduction of delays in compression of image data can be achieved.

In addition, as the program for causing a computer to function as the image processing devices according to the embodiments is executed by a processor or the like in the computer, an effect exhibited by the process relating to the image processing method according to the embodiments described above can be exhibited.

It should be understood by those skilled in the art that various modifications, combinations, sub-combinations and alterations may occur depending on design requirements and other factors insofar as they are within the scope of the appended claims or the equivalents thereof.

For example, the program for causing a computer to function as the image processing devices according to the embodiments (computer program) is described as being provided above; however, a recording medium for storing the program can also be provided in the embodiments The configurations described above are examples of the embodiments, and of course belong to the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An image processing device including:

a first rearrangement unit configured to rearrange first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions;

a compression processing unit configured to compress respective pieces of second divided image data, which are image data corresponding to the respective second divided regions, by performing a transform in a predetermined scheme, quantization, and variable length encoding on the data; and a second rearrangement unit configured to rearrange the compressed second divided image data in an order corresponding to all of the images to be processed.

(2)

The image processing device according to (1), wherein the first rearrangement unit specifies an arrangement order of the first divided image data for each of the first divided regions, and rearranges the first divided image data of the first divided regions corresponding to the respective second divided regions for each of the second divided regions in the order corresponding to the respective second divided regions.

(3)

The image processing device according to (2), wherein the processing target image data is image data generated from imaging of an imaging device that has a plurality of imaging elements, and wherein the arrangement order of the first divided image data of each of the first divided regions corresponds to a reading order of the imaging elements corresponding to the respective first divided regions.

(4)

The image processing device according to any one of (1) to (3), wherein the first divided regions are four regions obtained by dividing each of the images to be processed into two in each of the horizontal direction and the vertical direction, and wherein the second divided regions are two regions obtained by dividing each of the images to be processed into two in the horizontal direction.

(5)

The image processing device according to any one of (1) to (4), further including:

a correction unit configured to correct respective pieces of the first divided image data, wherein the first rearrangement unit rearranges the first divided image data corrected by the correction unit.

(6)

An image processing method executed by an image processing device, the method including:

rearranging first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions;

compressing respective pieces of second divided image data, which are image data corresponding to the respective second divided regions, by performing a transform in a predetermined scheme, quantization, and variable length encoding on the data; and rearranging the compressed second divided image data in an order corresponding to all of the images to be processed.

What is claimed is:

1. An image processing device comprising:

circuitry configured to correct respective pieces of first divided image data, the correction including determining a defective pixel through a threshold value process and interpolating the pixel value using an adjacent pixel value, rearrange the first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions, compress respective pieces of second divided image data, which are image data corresponding to the respective second divided regions, by performing a transform in a predetermined scheme, quantization, and variable length encoding on the data, rearrange the compressed second divided image data in an order corresponding to all of the images to be processed, and divide each of the images to be processed into four regions, including two divided regions in each of the horizontal direction and the vertical direction to constitute four regions, wherein a data rate of a number of frames/second of image data of each of the four regions is a fraction of a data rate of image data of each image to be processed, wherein the circuitry is further configured to convert image data of 480 frames/second into image data of 120 frames/second of four channels corresponding to the four respective divided regions.

2. The image processing device according to claim 1, wherein the circuitry is further configured to specify an arrangement order of the first divided image data for each of the first divided regions, and rearrange the first divided image data of the first divided regions corresponding to the respective second divided regions for each of the second divided regions in the order corresponding to the respective second divided regions.

3. The image processing device according to claim 2, wherein the processing target image data is image data generated from imaging of an imaging device that has a plurality of imaging elements, and wherein the arrangement order of the first divided image data of each of the first divided regions corresponds to a reading order of the imaging elements corresponding to the respective first divided regions.

4. The image processing device according to claim 1, wherein the circuitry is further configured to rearrange the first divided image data after the correction.

5. The image processing device according to claim 1, wherein the circuitry is further configured to rearrange the first divided image data in parallel with performing compression processing on the first divided image data.

6. The image processing device according to claim 1, wherein the circuitry is further configured to rearrange the second divided image data in a horizontal direction from an upper left side and further in a vertical downward direction of the second divided region.

7. An image processing method executed by an image processing device, the method comprising:

correcting respective pieces of first divided image data, the correcting including determining a defective pixel through a threshold value process and interpolating the pixel value using an adjacent pixel value;

rearranging the first divided image data, which is image data corresponding to respective first divided regions obtained by dividing images to be processed represented by processing target image data in the horizontal direction and in the vertical direction, for each of second divided regions, which is obtained by dividing the images to be processed composed of a plurality of the first divided regions, in an order corresponding to the respective second divided regions;

compressing respective pieces of second divided image data, which are image data corresponding to the respective second divided regions, by performing a transform in a predetermined scheme, quantization, and variable length encoding on the second divided image data;

rearranging the compressed second divided image data in an order corresponding to all of the images to be processed; and dividing each of the images to be processed into four regions, including two divided regions in each of the horizontal direction and the vertical direction to constitute four regions, wherein a data rate of a number of frames/second of image data of each of the four regions is a fraction of a data rate of image data of each image to be processed, the dividing including converting image data of 480 frames/second into image data of 120 frames/second of four channels corresponding to the four respective divided regions.

8. The image processing method according to claim 7, further comprising:

specifying an arrangement order of the first divided image data for each of the first divided regions, and rearranges the first divided image data of the first divided regions corresponding to the respective second divided regions for each of the second divided regions in the order corresponding to the respective second divided regions.

9. The image processing method according to claim 7, further comprising:

rearranging the first divided image data after the correction.

* * * * *